A. M. BLACK.
CHECK-ROWERS.
No. 183,113. Patented Oct. 10, 1876.
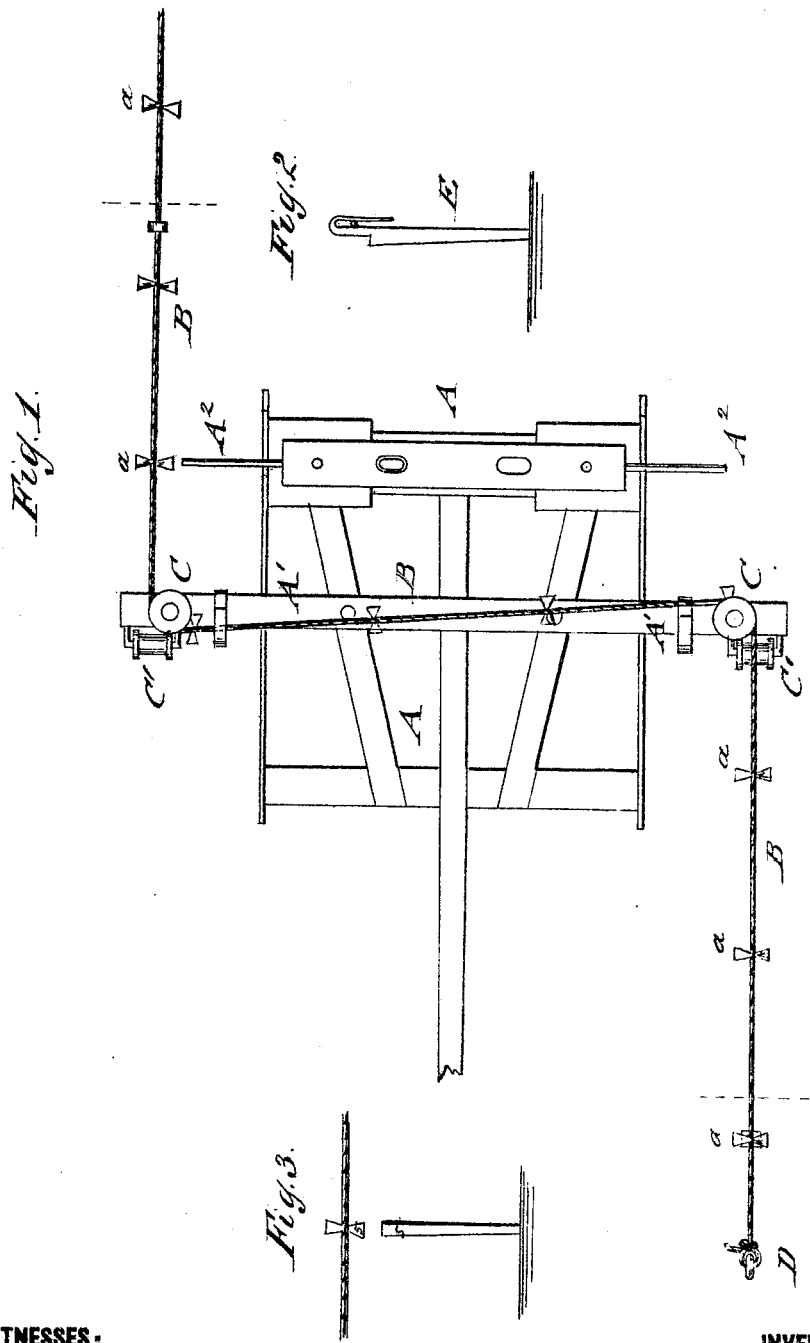

UNITED STATES PATENT OFFICE.

ALBERT M. BLACK, OF PAWNEE, ILLINOIS.

IMPROVEMENT IN CHECK-ROWERS.

Specification forming part of Letters Patent No. 183,113, dated October 10, 1876; application filed July 31, 1876.

*To all whom it may concern:*

Be it known that I, ALBERT M. BLACK, of Pawnee, in the county of Sangamon and State of Illinois, have invented a new and Improved Check-Rower, of which the following is a specification:

In the accompanying drawing, Figure 1 represents a top view of a corn-planter, with my improved check-rower attached; and Figs. 2 and 3 are respectively side views of a tension and number pin.

Similar letters of reference indicate corresponding parts.

My invention has reference to a check-rower, of simple and convenient construction, that is used in connection with a planter, and is readily adjusted on the ground without necessitating the marking of the same, securing the dropping of the corn in regular and reliable manner.

The invention consists of a cord or wire rope with tags, applied at suitable distances, said rope passing over guide-pulleys and rollers at the ends of a cross-bar of the planter, and being used in connection with pointers of the planter and fastening end stakes, tension, and number stakes.

In the drawing, A represents a corn-planter of any suitable construction, which is provided at the front part with a lateral bar, $A^1$, to the ends of which are applied horizontal pulleys C, over which the check cord or rope B, of suitable material, is stretched, so as to run in opposite direction. The check-rope B is provided at suitable distances, equal to the width of the rows to be planted, with tags $a$, of suitable material and color, and stretched across the field in the direction in which the rower is intended to be run, the end being firmly fastened by a stake, D, to one side of the piece of ground. The other end of the rope is then passed through the pulleys C and fastened back of the planter to another iron pin, D. Below the pulleys C are arranged, at the front side of the cross-bar, guide-rollers C', over which the rope passes to the pulley during the forward motion of the planter, one roller being brought into use when running in one direction, the other when running in opposite direction. At both sides of the dropper are pointer-rods $A^2$ that extend nearly up to the rope B, and serve to drop the corn each time when a tag passes the end of the pointer. When the rope is firmly set across the field, the planter is started and drawn across the field, the rope passing over the pulleys. The dropper keeps his eye fixed on the end of the pointer, and gives a pull to the drop-lever for depositing the required quantity of corn as each tag passes the end of the pointer. When the opposite side of the field is reached, the dropper takes a tension-pin, E, with spring top hook, and drives it some distance back of the planter into the ground, passing the spring-hook over the rope to retain the tension of the same. The stretching-pin at the end is then taken up, and the planter turned, the rope being drawn again through the pulleys and staked down at the opposite side of the planter, which is then ready to pass back over the field, dropping the corn in the same manner as before.

This mode of rowing saves the time of marking off the ground, and enables the farmer to plant in freshly-broken ground, so that the corn has a chance to get up before the weeds.

When it is desired to plant in other fields before the first is finished, the row is kept up for putting down the rope again when returning, by a number of pins that are placed along the rope, the numbers on the pins corresponding with the numbers of the tags on the rope. The rope is put down again by being arranged in the same position above the numbered stakes as before it was taken off, so that the rowing and dropping may be continued in the same regular and even manner as before.

Having thus described my invention, I claim as new and desire to secure by Letters Patent—

A vehicle, having cross-bar $A^1$, pointers $A^2$, pulleys C, and guides C', in combination with a cord, B, having tags $a$, arranged substantially as and for the purpose specified.

ALBERT M. BLACK.

Witnesses:
G. C. DRENNAN,
W. C. JOHNSON.